Feb. 28, 1950     J. M. PESTARINI     2,498,765
METADYNE GENERATOR AND PRIME MOVER CONTROL
Filed Oct. 7, 1946     3 Sheets-Sheet 1
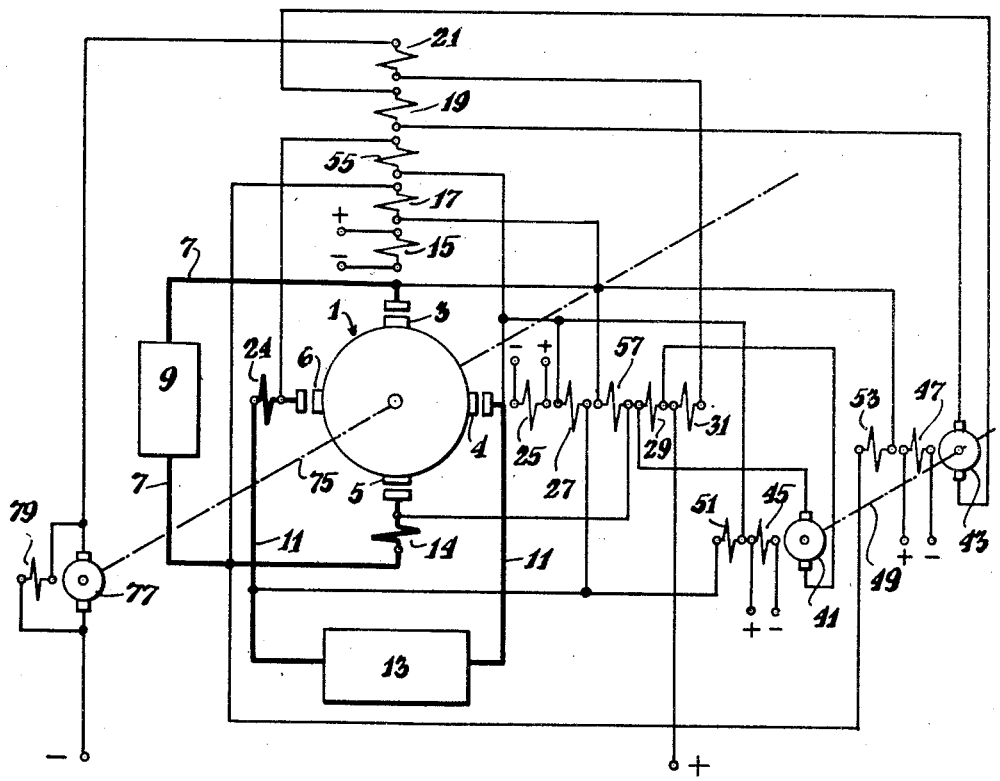
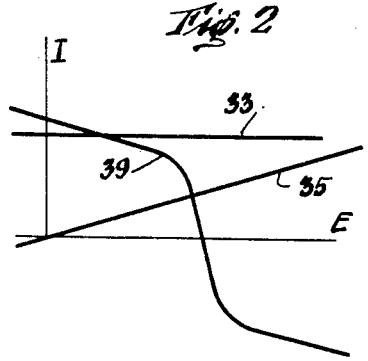
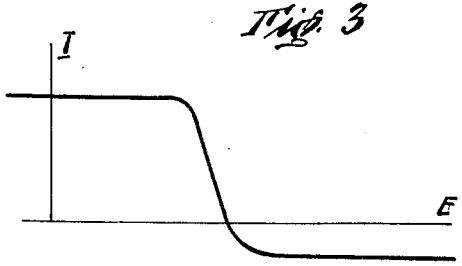
INVENTOR
Joseph Maximus Pestarini
BY George H. Corey
ATTORNEY Feb. 28, 1950  J. M. PESTARINI  2,498,765
METADYNE GENERATOR AND PRIME MOVER CONTROL
Filed Oct. 7, 1946  3 Sheets-Sheet 3
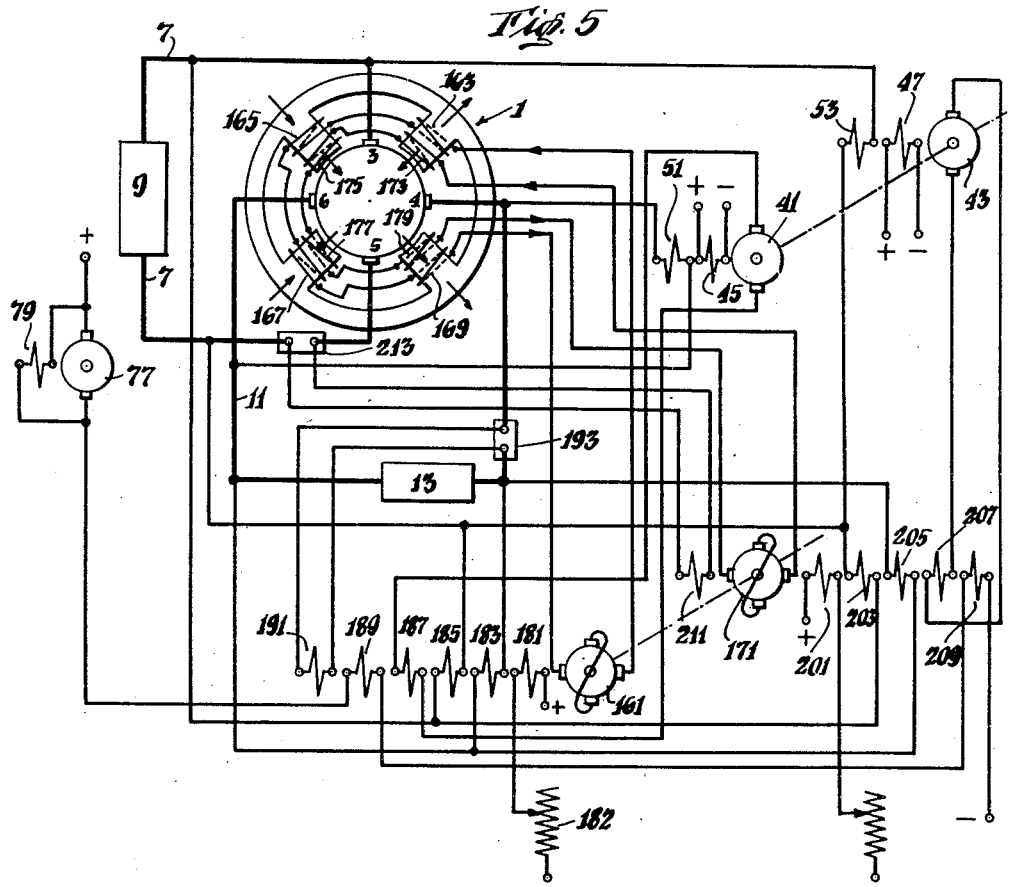
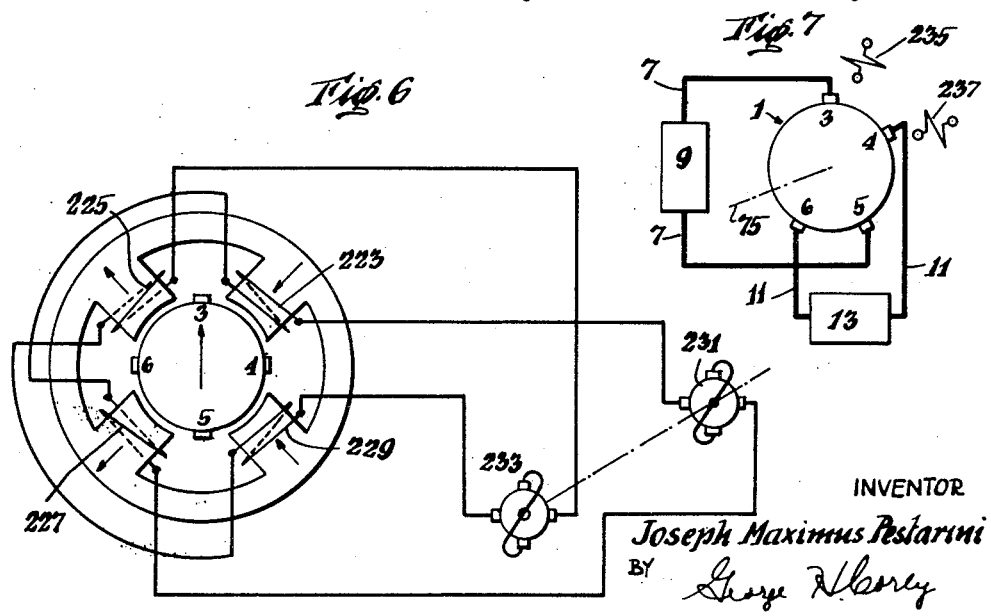
INVENTOR
Joseph Maximus Pestarini
BY George N. Carey
ATTORNEY Patented Feb. 28, 1950

2,498,765

UNITED STATES PATENT OFFICE 2,498,765

METADYNE GENERATOR AND PRIME MOVER CONTROL

Joseph Maximus Pestarini, Staten Island, N. Y.

Application October 7, 1946, Serial No. 701,793

34 Claims. (Cl. 290—40)

1

This invention relates to dynamoelectric machines for generating direct current. The invention more especially relates to such dynamoelectric machines driven by power means and electrically connected to a plurality of electrical loads.

The invention particularly relates to dynamoelectric machines of the type known as the "metadyne." Features of the metadyne and various applications thereof, as well as means for controlling the operation thereof under certain conditions, have been disclosed in my prior United States and foreign patents and in the publication Revue Générale de l'Electricité of March 8 and 15, 1930; August 16 and 23, 1930; November 22 and 29, 1930, and December 6, 1930, describing metadyne dynamoelectric apparatus.

Metadynes ordinarily are provided with a plurality of pairs of brushes, each pair interplaced with respect to the other about a commutator carried by an armature, said armature being rotatable by suitable driving means if the metadyne is operated as a generator. If the metadyne is to be operated as a motor, direct current energy may be supplied from an external source connected to one pair of brushes ordinarily designated as the primary brushes, the other pair of brushes being connected together in various ways as disclosed in the prior publications above referred to for securing particular conditions of operation. Metadynes also have been utilized with their primary brushes connected to a source of direct current and their secondary brushes connected to a load, such as a direct current motor, the energy being supplied from the source through the metadyne to the motor. In all such apparatus and systems as heretofore proposed utilizing the metadyne as a generator of direct current electrical energy only one pair of brushes has been available to supply the electrical load, the other pair of brushes being variously connected to variator windings to secure modulation of the ampere turns thereof, these variator windings having their effective magnetic axes variously disposed with respect to the primary brushes and to the secondary brushes. It has been possible, therefore, to supply only one load circuit from a set of primary and secondary brushes except when current has been supplied to such generator metadyne apparatus from a separate source.

It is an object of the invention to provide a dynamoelectric machine of the metadyne type for generating direct current which is capable of simultaneously supplying two or more exterior load circuits.

It is another object of the invention to provide a dynamoelectric machine of the metadyne type for generating direct current simultaneously to

2 supply a plurality of exterior load circuits with electric current to suit the different requirements of the loads connected in the respective circuits independently of the requirements of such loads in the other circuits.

It is a further object of the invention to provide direct current generating apparatus capable of supplying current to two or more exterior load circuits and for independently controlling the flow of current in such circuits.

It is an additional object of the invention to provide a dynamoelectric machine for generating direct current for independently supplying a plurality of circuits each having particular characteristics with respect to the voltage impressed upon and the current utilized in these circuits.

Another object of the invention is to provide means for controlling the operation of a generator metadyne to supply a plurality of load circuits so as to maintain predetermined conditions of operation for each circuit independently of the other.

A still further object of the invention is to provide means for controlling the operation of a metadyne generator capable of supplying two separate exterior load circuits and including means for controlling the operation of a prime mover for driving the metadyne generator.

It is a feature of the present invention, in contrast to the metadyne apparatus disclosed in my prior patents and publications, that the generator metadyne of the invention is so constructed and is provided with such means for determining the conditions of the magnetic circuits thereof that it is capable of controllably supplying a plurality of load circuits with electrical energy, which load circuits are connected to respective pairs of brushes of the metadyne. In a single cycle metadyne, for example, having a pair of primary brushes and a pair of secondary brushes, one such load circuit may be connected across the primary brushes and a second such load circuit may be connected across the secondary brushes. In general in the invention a plurality of load circuits are respectively connected across the brushes of the pairs of brushes which as in the conventional metadyne are interplaced one pair with respect to the other about the commutator of the metadyne armature. By means hereafter more fully described, currents which are caused to flow in each of these load circuits are supplied by the generator metadyne through the respective pairs of brushes and are determined one independently of the other. The current flowing in the primary load circuit connected to a pair of primary brushes, for example, either may be determined substantially or approximately in accordance with a predetermined characteristic or may be determined precisely in accordance with such characteristic depending upon the means utilized according to the invention for modulating this current flowing through these primary brushes. Similarly, and independently of the determination of the current in the primary load circuit, the current flowing in the secondary load circuit connected to the secondary brushes of the generator metadyne may be determined substantially or precisely in accordance with a predetermined characteristic depending upon the means associated with the secondary circuit for modulating current therein.

Among the means which according to the invention are utilized for effecting modulation of the current are variator windings positioned in relation to the respective primary and secondary brushes so that the effective magnetic axis of these windings is substantially in line with the flux which is generated by the current flowing through the armature between the two primary brushes or between the two secondary brushes as the case may be. The flux produced by such variator windings may be in the same direction as or may be opposed to such armature flux depending on the purpose to be accomplished. While variator windings similarly disposed have been proposed in my prior patents and publications for modulating the flux generated by the current flowing through the armature between the brushes of a pair of brushes to determine the current flowing in a single load circuit or for other purposes, I have now found that a plurality of load circuits may be controllably supplied from a plurality of pairs of brushes of a generator metadyne by utilizing variator windings in a manner similar to that heretofore proposed, although in certain particular relations and with certain characteristics for the purposes of the inventions, provided that the metadyne generator is constructed so that the magnetizing current required to flow in the armature winding is reduced to such a degree as to be negligible, if it is desired to secure only approximate or substantial independence of the operation of the several circuits connected to the different brushes of the metadyne.

In one aspect of the invention in order to reduce the magnetizing current to secure the desired approximate independence of operation of the several circuits it is now proposed to reduce as much as possible the air gap between the armature and the poles of the stator which may support any excitation or variator windings utilized in the apparatus of the invention and to increase as much as possible the number of turns in the armature winding. The reluctance of the magnetic circuit including the armature and the stator is reduced as much as possible and the permeability of the iron of this circuit is made as high as possible. By designing the apparatus of the invention with a magnetic circuit having these characteristics it becomes possible in accordance with the invention to secure approximate or substantial independence of the control by means of the different variator windings of the currents flowing in the two circuits connected to the respective pairs of brushes.

In order further to reduce the magnetizing current a stator winding may be utilized which is positioned with its effective magnetic axis substantially in line with the flux generated by the current flowing through the armature between the brushes to which the particular load circuit is connected and generates a flux acting in the same direction as said armature flux. This winding which may be termed the amplifier winding is connected in series in the particular load circuit so as to carry the current flowing in this load circuit. The effect of this amplifier winding thus positioned and arranged is to reduce the magnetizing current flowing in the circuit connected to the brushes. Although entire elimination of the magnetizing current ordinarily is not accomplished by the use of this amplifier winding, reduction of this magnetizing current may be effected to the extent that it may be neglected insofar as it has effect upon the independence of the control of the two circuits, that is, the primary circuit and the secondary circuit one with respect to the other. It is, of course, to be understood that such an amplifier winding may be associated with either or both circuits in order to accomplish the requisite reduction of the magnetizing current to secure for the respective circuits the desired substantial independence.

In another aspect it is an important feature of the invention, however, that precise determination and control of the current flowing in the respective circuits, or in either of them, one independently of the other, which are connected to respective pairs of brushes in the generator metadyne of the invention may be accomplished by utilizing a variator winding having its effective magnetic axis substantially in line with the flux generated by the current flowing through the armature between the brushes to which the particular circuit is connected, this variator winding being connected across the brushes of another pair of brushes displaced about the commutator of the armature, the characteristic of this variator winding being particularly determined in the manner about to be described. Thus, for example, in the case of a single cycle metadyne generator having a pair of primary brushes and a pair of secondary brushes displaced 90 electrical degrees from the primary brushes and with a load circuit connected to the primary brushes, a variator winding having its effective magnetic axis substantially in line with the flux generated in the armature by the current flowing between the primary brushes may be connected across the secondary brushes. In order to accomplish precise determination of current in this primary circuit in accordance with this feature of the invention the resistances of this variator winding thus associated with the primary brushes and connected across the secondary brushes and including the resistances of such connections is adjusted, if necessary by means of additional resistance connected in series therewith, so that for the speed of rotation of the metadyne generator armature the current flowing in this winding develops excitation in the magnetic field of this winding below saturation and substantially that corresponding to the critical speed. The current and, therefore, the ampere turns thus determined by this variator winding remain proportional to the induced voltage and have exactly the value required for inducing this voltage for a wide variation of the said voltage across the secondary brushes. As a consequence, this variator winding undertakes the duty which the primary current otherwise would have had to perform for magnetizing the magnetic circuit for inducing the voltage required across the secondary brushes. Thus, it allows the primary current to be independent from the variations of the voltage across the secondary brushes and, therefore, independent from the current variations of the secondary circuit.

A similar variator winding may be provided with its effective magnetic axis substantially in line with the flux generated by the current flowing through the armature between the secondary brushes, this variator winding being connected across the primary brushes and, if necessary to obtain excitation below saturation, also being connected in series with a resistance suitably adjusted to secure such operation and the resultant full independence of the current in this secondary current from the conditions in the primary circuit.

In order to secure particular characteristics, other variator windings may be utilized in cooperation with the means above described for developing constant ampere turns to determine constant flow of current in the load circuit, for determining a current in such circuit increasing or decreasing with the voltage or for securing a characteristic corresponding to the characteristics of a dynamoelectric machine operating through the nonsaturated and saturated ranges. The arrangement and functions of such variator windings will be more fully described in connection with the drawings.

In another phase of the invention control devices are provided for determinining and for controlling and regulating the speed of the metadyne generator. Particularly where such a metadyne generator is driven by a prime mover supplied with a fluid for developing power in the prime mover, the invention provides control apparatus for controlling flow of the fluid to control or to vary or to maintain the speed of the metadyne generator. The invention provides devices which may be set to determine the flow of the fluid to the prime mover. In cooperation with these control devices the invention provides means including regulator variator windings which are respectively associated with the load circuits supplied by the generator metadyne and which have their effective magnetic axes in line with the other associated variator windings above referred to, these regulator variator windings being effective to modulate the current flowing in the respective load circuits in accordance with the variations of the speed of the generator metadyne or in accordance with the setting of the fluid control device or in accordance with both. Automatically actuated means also are provided in accordance with this phase of the invention for operating a throttle for control of the fluid flowing to the prime mover and thereby controlling the speed in accordance with variations thereof. These means are effective also to vary the excitation current in one or more of the variator windings to modulate the currents flowing in the load circuits. These and other features of the invention will be more fully described in connection with the drawings, in which Fig. 1 shows diagrammatically a single cycle metadyne generator having its primary and secondary brushes connected respectively to load circuits and provided with variator windings determining and controlling the current flowing in these circuits;

Fig. 2 shows three elemental characteristic curves determined by respective variator windings;

Fig. 3 shows the characteristic curve produced by the combined effect of the winding the elemental characteristics of which are shown in Fig. 2;

Fig. 4 shows a single cycle metadyne generator connected to two load circuits and provided with variator windings and control apparatus for purposes above referred to;

Fig. 5 shows a modification of the apparatus of Fig. 1;

Fig. 6 shows a modification of a portion of the apparatus of Fig. 5;

Fig. 7 is a diagram showing the generalized arrangement of the brushes of a metadyne generator and the load circuits connected thereto and the variator windings associated therewith.

Figure 4:
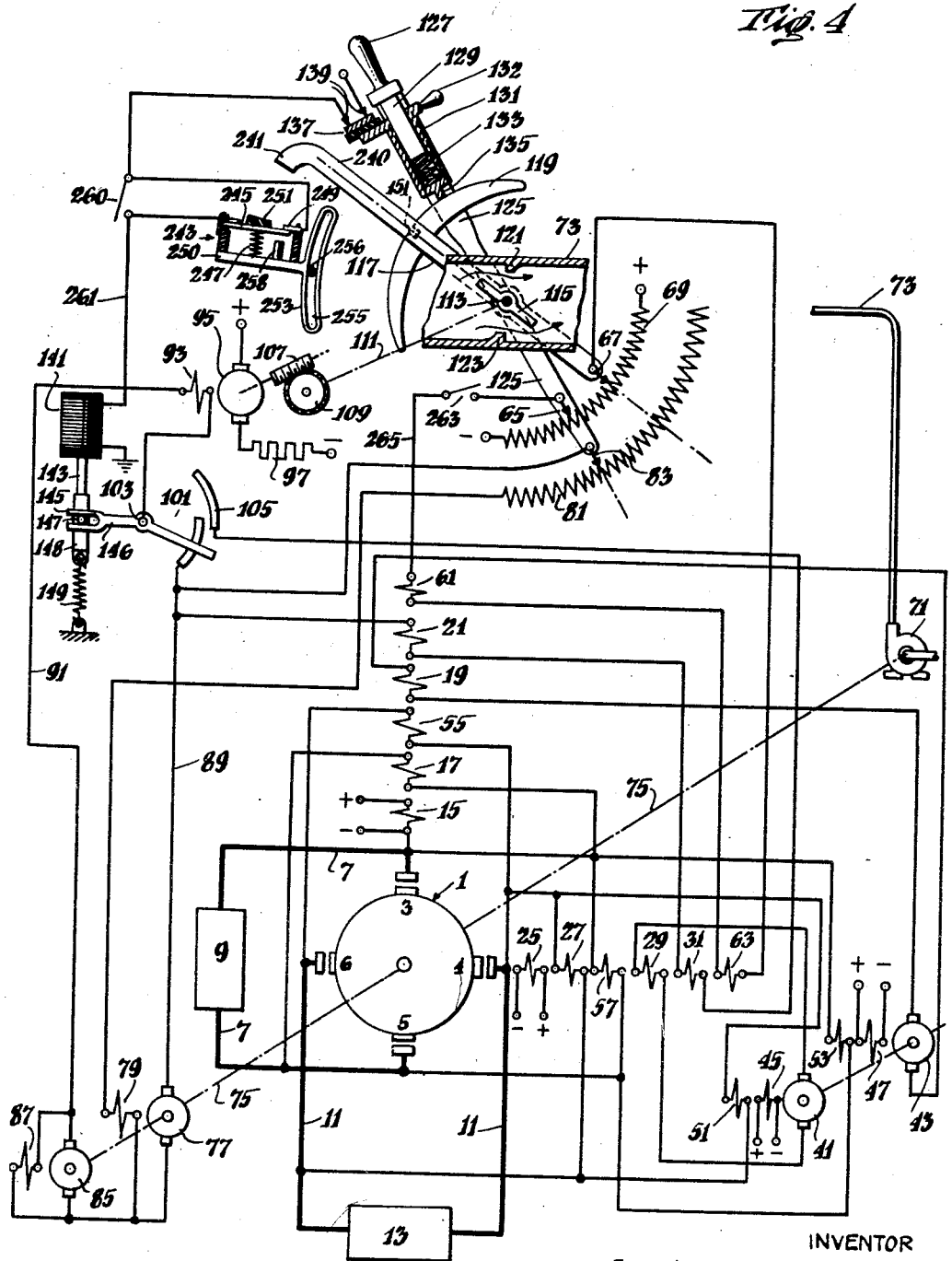

Fig. 1 represents diagrammatically a single cycle metadyne generator 1 having primary brushes 3, 5 and having secondary brushes 4, 6 interplaced between the primary brushes. In the particular embodiment of Fig. 1 secondary brushes are intended to be positioned at 90 electrical degrees from the primary brushes. The primary brushes are connected by leads 7 to load 9, such as a battery to be charged or a direct current motor or other load requiring direct current. The secondary brushes 4, 6 are similarly connected by the leads 11 to a load 13 which may be of the same character as, or different from, the load of the primary circuit. Adjacent the respective brushes 3, 4, 5, 6 are shown terminals to which respectively the leads 7 and the leads 11 are connected, it being understood that a stator winding, such as a series field or a commutating winding traversed by the current of the respective brushes, may be connected between such terminals and the respective adjacent brushes. In order to simplify the drawing these windings are omitted since they, in themselves, do not form a part of the invention.

In such a metadyne generator it is well understood that the current flowing through the circuit connected to the two brushes of a pair of brushes, for example the primary brushes 3, 5, comprises two parts, one the current induced in the armature due to the stator windings associated with said brushes, the other part being the magnetizing current requisite to maintain the armature magnetized. The induced current represents the greater part of the total current flowing in the armature and in the exterior load circuit. In the conventional metadyne this part may be between 80% and 85%, the balance being the armature magnetizing current.

In order to determine and to control the characteristics of the respective exterior circuits and particularly to determine and control the currents flowing therein, one or more variator windings positioned with their effective magnetic axes substantially in line with the flux which is generated in the armature by current flowing through the armature winding between the brushes of the respective pairs of brushes may be utilized. In Fig. 1, for example, is shown a set of windings 14, 15, 17, 55, 19, 21 all having their effective magnetic axes in line with the fluxes produced by the flow of current through the armature between the primary brushes 3, 5. Similarly in Fig. 1 associated with the secondary brushes 4, 6 and having their effective magnetic axes substantially in line with the flux produced by the flow of current through the armature between the secondary brushes 4, 6 is positioned a set of variator windings 24, 25, 27, 57, 29, 31 corresponding respectively to the variator windings 14, 15, 17, 57, 19, 21. In the particular embodiment of Fig. 1 the effective magnetic axes of the sets of windings are at 90° one from the other in conformity with the construction of the simple single cycle generator metadyne having the secondary brushes displaced 90° from the primary brushes as above indicated. The particular function of each of these windings will be more particularly described hereafter. It will be noted that certain of these variator windings are connected across a source of constant potential. Others are connected across the brushes between which the current flows which produces the flux which is in line with the effective magnetic axis of the windings. Still others are connected across the other brushes through which armature the current flows which produces a flux in line with the other set of windings. In addition, in Fig. 1, certain of the variator windings are connected to direct current generators of different characteristics in order that the characteristics of the respective circuits connected to the primary brushes and to the secondary brushes through leads 7 and 11 may be determined and so that these characteristics may be modulated in accordance with variations in the speed of the metadyne generator. It will be understood, as hereafter more fully explained, that the modulation or adjustment of the excitation effected by means of the different variator windings associated with the respective sets of brushes may be so accomplished that the control of the currents flowing in the respective load circuits may be secured approximately independently of each other, or, if desired, may be secured fully independently one from the other.

In order to secure control of the current flowing in the respective load circuits in accordance with given characteristics and with approximate independence, one from the other, the characteristics of the magnetic circuits which these windings produce are determined for the purposes of the invention so as to minimize the effect of the magnetizing current in the armature. To this end it is proposed to utilize highly permeable iron cores in the stator for the variator windings as well as in the armature, to provide as small an air gap as possible and otherwise so to construct the stator and armature as to reduce as far as possible the reluctance of the magnetic circuit, and to utilize as large a number of turns in the armature as possible. By such mechanical, electrical and magnetic construction of the structure supporting the variator windings in relation to the armature and of the armature itself the effect of the magnetizing current in the armature may be reduced to a low value, and, if desired, may be made not substantially greater than 5% of the total current flowing through the armature winding. In a practical commercial construction according to this aspect of the invention the magnetizing current may be so reduced that it is not substantially greater than 10% of the total armature current. By thus minimizing the magnetizing current the remaining portion of the armature current becomes substantially or approximately that flowing in the exterior circuit connected to the brushes between which the armature current flows. To the extent that such reduction of the magnetizing current is accomplished the circuit connected to such brushes is independent of the circuit connected to the other brushes of the metadyne generator and its characteristics may be determined by the variator windings utilized.

In order further to reduce the magnetizing current in accordance with this aspect of the invention in the embodiment of Fig. 1 amplifier windings 14 and 24 respectively are connected in series in the load circuits 7 and 11 and in series with the terminals associated with the brushes 5 and 6. If desired these amplifier windings 14 and 24 may be connected respectively in series with the brushes 3 and 4 instead of the brushes 5 and 6 or amplifier windings may be connected respectively in series with both brushes 5 and 3 and both brushes 6 and 4. These amplifier windings respectively have their magnetic axes substantially in line with the fluxes which are generated in the armature by the currents flowing through the armature respectively between the primary brushes 3, 5 and between the secondary brushes 4, 6. The winding 14 is so connected that it generates a flux in the same direction as, that is, not opposed to, the flux produced by the current flowing between the primary brushes 3, 5. The amplifier winding 24 is so connected that it produces a flux in the same direction as the flux produced by the current flowing through the secondary brushes 4, 6. As above indicated the effect of this amplifier winding is to strongly oppose the magnetizing current flowing through the armature and through the respective exterior load circuits 7 and 11, thereby to reduce the current flowing in these exterior circuits substantially to that required for the respective loads 9 and 13. Substantial independence of the control of the currents flowing in these two circuits, therefore, is accomplished by means of the windings 14 and 24.

In order to secure the characteristic of a constant current for the respective circuits connected to the loads 9 and 13 in Fig. 1 the variator windings 15 and 25 respectively are connected to sources of constant potential difference. As each such winding will be formed of a given number of turns and will have a given resistance, connection of these windings to the constant potential difference determines a constant current flowing therethrough and, therefore, a constant number of ampere turns. The magnetic flux produced by each such winding having its axis in line with the flux produced by the current flowing through the armature may act in the same direction as said armature flux or in opposed relation thereto in order to determine the desired reactive effect on the voltage of the circuit connected to the brushes with which the winding is associated. Such a constant flux, in accordance with the principle of the metadyne, may be utilized to determine a constant current flowing in the primary circuit 7 or in the secondary circuit 11 as indicated by line 33 of Fig. 2 in which the ordinates may represent the current flowing in the circuit 7 or in the circuit 11, the abscissae representing the corresponding voltage across the primary brushes 3, 5 or across the secondary brushes 4, 6.

If it is desired that the characteristic of the current flowing through the circuit shall be such as to increase in accordance with the voltage impressed thereon at the brushes to which these circuits are connected windings 17 and 27 may be utilized having their effective magnetic axes similarly placed with respect to the armature flux as are the effective magnetic axes of the windings 15 and 25. The windings 17 and 27 are connected respectively across the primary brushes 3, 5 and across the secondary brushes 4, 6. The windings may be so connected that the characteristic produced by the windings 17 and 27 is one which is indicated by the line 35 in Fig. 2 in which the current is increased in proportion to the increase in the voltage of the respective brushes to which the circuits 7 and 11 are connected.

In order to secure a characteristic in the respective circuits 7 and 11 in which the current flowing through the circuit will be maintained at a substantial value for a considerable variation in the voltage and then will fall rapidly with the relatively small increase in voltage until the current reaches zero, and thereafter may become reversed as the voltage is still further increased, the windings 19 and 29 may be provided with their effective magnetic axes in line with those of the windings as above indicated, the windings 29 and 19 respectively being connected to the brushes of auxiliary direct current generators 41, 43. In the embodiment of Fig. 1 these generators are respectively excited by field windings 45 and 47 each of which is connected across a source of constant potential difference. The generators 41, 43 may be separately driven or, as shown in Fig. 1, may be mounted on the same shaft diagrammatically represented by the line 49 or may be otherwise operatively connected together to rotate the armatures thereof. These generators 41, 43 are so designed that when thus driven they will develop an unsaturated condition of operation or will develop a saturated condition of operation depending upon the excitation provided by the windings 45, 47 and by the windings 51, 53 which respectively are connected across the secondary brushes 4, 6 and the primary brushes 3, 5 of the metadyne generator, that is, across the respective brushes with which the windings 29 and 19 are associated, these windings 29 and 19 being those which are supplied by the respective generators 41, 43. The windings 51, 53 may be so formed and arranged in relation to the windings 45, 47 that as the voltages across the secondary brushes 4, 6 and the primary brushes 3, 5 vary the excitation provided by the windings 51, 53 will correspondingly vary in the manner shown by the curve 39 in Fig. 2.

The combined effects of the windings 15, 17, 19 in relation to the primary circuit connected to the load 9 and of the windings 25, 27 and 29 in relation to the secondary circuit connected to the load 13 may be represented by a curve which combines the curves 33, 35, 39 of Fig. 2. Fig. 3 shows such a composite curve. These curves represent merely typical characteristics and one combination characteristic of operation for either of the circuits connected to the loads 9 and 13. It will be apparent that by varying the number of ampere turns, or the resistance of the windings or the voltage impressed thereon, or by varying the characteristic of the auxiliary generators 41 and 43 the composite curve of Fig. 3 may be varied and such composite curve for one circuit may be different from that of the other circuit depending upon the electrical and magnetic characteristics of the variator windings associated with the corresponding brushes and the manner in which these windings are energized.

In order to secure precise determination of the characteristic of the current in relation to voltage for the different load circuits, in accordance with the invention supplementary variator windings 55, 57 may be arranged with their effective magnetic axes substantially in line with the armature fluxes as are the other variator windings as above described, these supplementary variator windings 55, 57 respectively being connected, not across the brushes between which the current flows through the armature which develops the flux which is in line with these effective magnetic axes, but across the other brushes. Thus the supplementary winding 55 which has its effective magnetic axis in line with the flux generated by the current flowing between the brushes 3, 5 is connected across the secondary brushes 4, 6. Similarly, the supplementary winding 57 associated with the secondary brushes 4, 6 is connected across the primary brushes 3, 5. The windings 55, 57 are so connected across the brushes that the fluxes which they generate are in the same direction as the fluxes generated by the current flowing in the armature between the respective brushes. There is thus brought into cooperation with the other variator windings, or any one of them which it may be desired to utilize, a supplementary variator winding the ampere turns of which are determined in accordance with the voltage across the brushes of the other interplaced pair of brushes. In accordance with the invention it is found that by suitable determination of the resistance of such supplementary variator windings or by connecting in series therewith adjusted resistances the ampere turns of these supplementary windings may be made such that the excitation of these windings will be that of a condition below saturation of the magnetic circuit and may be that corresponding substantially to the critical speed of the generator metadyne to produce the current voltage relation below saturation. The current flowing through such supplementary winding will be proportional to the voltage existing between the brushes to which the winding is connected and it will provide the ampere turns which are exactly necessary for inducing the actual voltage between these brushes whatever may be the value of such voltage, provided that the corresponding flux does not produce the condition of saturation, that is to say that the condition of building up exists. The adjustment of the resistance of this variator winding may be obtained by connecting a supplementary resistor in its circuit. When such adjustment of the resistance of the windings 55, 57 is accomplished the armature magnetizing current may be reduced to zero because of the neutralizing effect of the fluxes which respectively are produced by the windings 55, 57 having their effective magnetic axes in line with those armature fluxes which respectively generate potential differences opposed to the voltages to which the windings 55, 57 are connected. Although in the description of the apparatus of Fig. 1 the windings 17 and 53 are described as being connected across the primary brushes 3, 5 and windings 27 and 51 as being connected across the secondary brushes 4, 6 these windings are so connected as to include respectively the amplifier windings 14 and 24. The direct connection, however, of these windings across the respective brushes is shown in Fig. 4. The modification of Fig. 1 may be used for certain purposes or where it is more convenient since the voltage drop across the amplifier windings 14, 24 will not be great.

In Fig. 1 is shown a regulator direct current generator 77 the armature of which is mounted on the shaft 75 of the metadyne generator 1 or is otherwise operatively connected to rotate together with the armature of the metadyne generator. The regulator generator 77 is provided with a shunt field 79 and is connected in series with the variator windings 21 and 31 which are connected in series with each other and across a source of constant potential difference. The regulator generator 77 is excited by the field winding 79 below saturation at the speed thereof as driven by the metadyne generator, the regulator generator 77 operating at approximately its critical speed so that a wide variation in the voltage thereof may take place with a small variation in the rotational speed, that is to say the resistance of the field winding 79 is adjusted for the building up condition. This current flowing through the variator windings 21 and 31, in consideration of the opposed potential difference across which the regulator generator and windings 21 and 31 are connected, increases and decreases to a marked degree with small variations in speed of the armature of the metadyne generator. The windings 21 and 31 are so connected that the ampere turns produced thereby are effective to modify the currents supplied to the external circuits in such a direction as to modify the load in these circuits so as to maintain the speed of the metadyne generator substantially constant.

In Fig. 4 is diagrammatically shown the metadyne generator 1 of the invention provided with primary brushes 3, 5 and secondary brushes 4, 6 as in the apparatus of Fig. 1. The apparatus of Fig. 4 is provided with variator windings 15, 17, 55, 19 and 21 associated with the primary brushes 3, 5 and having the same function as the variator windings of the same numerals of Fig. 1. Similarly the apparatus of Fig. 4 is provided with variator windings 25, 27, 57, 29 and 31 associated with the secondary brushes 4, 6 and having the same function as the correspondingly numbered variator windings of Fig. 1. As in the apparatus of Fig. 1 the apparatus of Fig. 4 is provided with auxiliary generators 41 and 43 having the respective excitation windings 45 and 47 connected across sources of constant potential differences; also excitation windings 51 and 53 which respectively are connected across the secondary brushes 4, 6 and across the primary brushes 3, 5, these generators 41 and 43 functioning in the same manner as described in connection with Fig. 1.

In addition to the variator windings above referred to in the apparatus of Fig. 4 and adjustor variator winding 61 is provided having its effective magnetic axis in line with the axis of the flux generated by the current flowing through the armature between the primary brushes 3, 5. This winding 6 is connected in series with an adjustor variator winding 63 having its effective magnetic axis substantially in line with the flux generated by the current flowing through the armature between the secondary brushes 4, 6. The windings 61 and 63 are connected in series respectively with the movable contact points 65 and 67 of a potentiometer or similar variable resistance 69 supplied from a source of direct current potential difference across the ends of the resistance 69. The contact points 65, 67 are moved by means hereafter described to different positions with respect to the potentiometer resistance 69. It will be apparent, therefore, that the potential difference which is effective to produce flow of current through the variator windings 61 and 63, this current being the same in both of these windings, is determined by the distance apart at which the contact points 65 and 67 become positioned along the resistance 69. Movement of either or both of these contact points will change the resistance and, therefore, will change the excitation provided by the variator windings 61 and 63. As will hereafter appear, the positions of these contact points 65 and 67 are made to correspond to the positions of a control means for controlling the means for driving the metadyne generator 1 and this control means may operate to bring the two contacts 65 and 67 into coincidence so that there is no potention difference between them. This driving means in the particular embodiment illustrated in Fig. 4 is a prime mover 71 utilizing a fluid supplied through the pipe 73, the prime mover 71 being connected by shaft 76 or similar operative driving means to the metadyne generator 1 to effect rotation of the armature thereof. Other driving means, such as an electric motor, which will produce continuous rotation of the armature of the metadyne may be used. A control means adapted for such other driving means then will be substituted for that shown in Fig. 4.

Also mounted on the shaft 75 or otherwise operatively connected thereto is a direct current regulator generator 77. The regulator generator 77 has an excitation winding 79 connected in shunt relation to the brushes thereof through a rheostat 81 having the movable contact member 83 thereof mounted upon or otherwise operatively connected to a member of the control device for controlling the flow of the fluid through the pipe 73. The excitation winding 79 and the resistance provided by the rheostat 81 are so constructed and adjusted that the generator 77 operates at a point below the zone of saturation thereof provided by the excitation winding 79 and in the region of its critical speed. It is sensitive, therefore, to variations in the speed of the metadyne generator 1 so as to supply a relatively wide variation in the current in the winding 79 for small departures from the critical speed of the generator 77, that is for small variations in the speed of the metadyne generator. It will be apparent, therefore, that the regulator generator 77 in the embodiment of Fig. 4 has the same general characteristics as the generator 77 in Fig. 1.

The regulator generator 77 in Fig. 4 is connectible in series with the variator windings 21 and 31 which are connected in series with each other. The circuit may be established in series through these variator windings 21 and 31 and through the shunt excited direct current generator 85 having a shunt winding 87. The generator 85 is connected in opposed relation to the regulator generator 77, thus acting in a manner similar to the source of constant potential provided in the apparatus of Fig. 1 across which the regulator generator 77 and the windings 21 and 31 in series therewith are connected. The characteristic of the direct current generator 85, however, is one which provides operation above the saturation point thereof and, therefore, provides a substantially constant voltage opposed to the voltage of the generator 77. This voltage, however, is less than the voltage of the regulator generator above its saturation point, the critical speed of the regulator generator being above that of the opposed direct current generator 85. It will be apparent, therefore, that, if the speed of the metadyne generator 1 tends to increase, the voltage of the regulator generator will rapidly rise, the voltage of the opposed direct current generator 85 tending to remain constant. Thus the current will be caused to flow in a given direction through the circuit which includes the wires 89 and 91.

In this circuit is connected the field excitation winding 93 of an oscillatable relay or governing motor 95, the armature of which is connected across a source of constant potential through the resistance grid 97. The direction of the current flowing through the excitation winding 93 determines the direction of the rotation of the governing motor 95. If the speed of the metadyne generator shaft 75 decreases and therefore, the speed of the regulator generator 77 decreases, a sharp reduction in the voltage generated by the generator 77 will occur. If this voltage falls below the voltage produced by the generator 85 the current in the circuits 89 and 91 and the excitation winding 93 will be reversed, with consequent reversal of the direction of the governing motor 95.

The circuit through the wires 89 and 91 and the excitation winding 93 is established through the conductor bar 99 and the switch blade 101 pivotally supported on a spindle 103 for movement in the vertical plane in Fig. 4. The switch blade 101 may take a position in the contact alone with the conductor bar 99 to provide a circuit through the excitation winding 93 as just described. The blade 101, however, may be moved to a transition position where contact is made with both the conductor bar 99 and a second conductor bar 105 to short circuit the variator windings 21 and 31, the variator windings 21 and 31 which are in series with each other being connected between the conductor bars 99 and 105. Movement of the switch blade 101 upward from the position shown in Fig. 4 through the transition position disengages this blade from the conductor bar 99 and leaves it in contact only with the conductor bar 105. The circuit from the regulator generator 77 then is established through the windings 21 and 31, the excitation winding 93 of the governing motor 95 and through the opposed direct current generator 85. If the speed of the shaft 75 of the metadyne generator 1 is such that the voltage of the regulator generator exceeds the voltage of the opposed direct current generator, the current will be caused to flow through the variator windings 21, 31 in a given direction. The windings 21 and 31 are so connected that their ampere turns are effective to modify the currents supplied by the metadyne generator to the external circuits in such a direction as to modify the load in these circuits so as to maintain the speed of the metadyne generator substantially constant. If the speed of the shaft 75 decreases with the consequent reversal of the current flowing in the wires 89 and 91 and in the excitation winding 93 of the governing motor 95 the current will also be reversed in the windings 21 and 31 when the switch blade 101 still is in contact alone with the conductor bar 105. Concomitant with reversal of the governing motor 95 the direction of the flux produced by the windings 21 and 31 will be reversed with corresponding reversal of the effect thereof in relation to the armature fluxes, thus tending to maintain constant the current in the exterior circuits 7 and 11.

The armature of the governing motor 95 is connected to drive a worm 107 meshing with worm gear 109. The worm gear 109 is fastened on a shaft diagrammatically represented by the line 111 operatively connecting the worm gear 109 to a spindle 113 associated with the pipe 73 and carrying a butterfly valve 115 supported by the spindle 113 for oscillating movement within the pipe 73. Also fastened on the spindle 113 is an arm 117 having at one end thereof a quadrant 119, the other end of the arm 117 carrying the contact 67 above referred to which is movable over the potentiometer 69. Rotational movement of the shaft 111 in one direction or the other produced by the governing motor 95 is effective to move the quadrant 119 upon the axis of the spindle 113 and at the same time to move the contact 67 along the potentiometer 69. Such movement of these parts also is effective to move the butterfly valve 115 to and from the closed position in which the edges of this valve come into contact respectively with the valve seats 121, 123. It will be understood, therefore, that as the armature of the governing motor 95 rotates in a given direction the butterfly valve 115 will be closed, that is, will be moved in the clockwise direction, in Fig. 4, into contact with the valve seats 121 and 123. Reverse rotation of the armature of the governing motor 95 is effective to open the butterfly valve 115 to permit a fluid, such as steam or a gas or a liquid fuel utilizable in a gas engine, to flow through the pipe 73 to the prime mover 71. Such a prime mover may be a steam turbine or a gas turbine or an internal combustion engine or other prime mover. It will be understood, therefore, that the regulator generator 77 cooperating with the opposed direct current generator 85 and the governing motor 95 operatively connected to the control device which includes the butterfly valve 115 are effective to control the speed of the metadyne generator 1 and that the characteristic of the respective circuits 7 and 9 and the currents flowing therein are maintained by virtue of the several variator windings although variations in the speed of the prime mover and, therefore, of the generator metadyne may occur.

In the operation of some types of apparatus for which the invention is suitable it may be desirable to provide the regulation and control above described for a certain range of speed or of power output of the prime mover 71 and of the generator metadyne 1. Thereafter it may be desirable to provide continuous delivery of the fluid to the prime mover 71 and to prevent further movement of the control device, such as the butterfly valve 115 controlling the flow of fluid to the prime mover 71. This may be accomplished by providing a suitable arm 125 supported on the spindle 113 but not fastened thereto so as to be pivotally movable relative to this spindle. This arm 125 may be set by hand by means of the handle 127 to different positions angularly displaced one with respect to the other about the axis of the spindle 113. The handle 127 is rigidly fastened to the arm 125 and has rigidly attached thereto a stud 129 fitting in a sleeve 131 slidable thereon. A compression spring 133 is provided between the end of the stud 129 and the inner end of the sleeve 131, this spring being effective to bias the sleeve 131 downwardly in Fig. 4 with respect to the stud 129 and, therefore, with respect to the arm 125. The sleeve 131 is provided with a toe-piece 135 extending downwardly therefrom into sliding engagement with the exterior circumference of the quadrant 119. When the toe-piece 135 is in contact with this exterior surface a contact piece 137 insulated from but carried upon the sleeve 131 is brought into engagement with contacts 139 to close the circuit through these contacts and through a solenoid 141 across a source of potential difference. As long as the circuit is closed through the contacts 139 the solenoid 141 is energized. The armature 143 of this solenoid is thereby drawn upwardly, thus raising the forked end 145 of the lever arm 146 which extends oppositely from the switch blade 101, this forked end 145 being engaged by a pin 147 fastened in the extension 148 of the armature 143 of the solenoid. By means of spring 149 the solenoid armature and the forked arm 145 are biased downwardly in Fig. 4, thus tending to maintain the switch blade 101 only in contact with the conductor bar 105 to include the variator windings 21 and 31 in circuit with the regulator generator 77, as above described. As long, however, as the solenoid is energized by toe-piece 135 bearing on the circumferential surface of the quadrant 119, the switch blade 101 is maintained in the position shown in Fig. 4 in which the circuit through the windings 21, 31 is open.

When the arm 125 has been set by the operator in a given position, for example, that shown in Fig. 4, the contacts 139 being closed, solenoid 141 being energized, variator windings 21 and 31 being short circuited, variations in the speed of the metadyne generator 1 may occur but will be controlled in the manner above described by the operation of the regulator generator 77 and the opposed direct current generator 85 and the governing motor 95 controlling the valve 115. Setting of the arm 125, moreover, determines the corresponding position of the contact 83 carried by this arm 125 and movable along the rheostat 81 as above described. This determines the excitation of the regulator generator 77 by the excitation winding 79. The arm 125 may be set in such a position that the speed of the generator metadyne 1 may be increased with corresponding opening of the butterfly valve 115 to a point where the governing motor 95 is effective to move the arm 117 and the quadrant 119 carried thereby until a notch 151 formed in the circumference of the quadrant 119 comes into register with the toe-piece 135. Under the bias of the spring 133 the sleeve 131 then will move downwardly on the stud 129 and the toe-piece 135 will move into the notch 151. Thereafter the butterfly valve will be maintained in a given position relative to the seats 121 and 123 to determine the flow of fluid through the pipe 73 to the prime mover 71. It will be noted also that when this position is reached the excitation of the regulator generator 77 also becomes determined by the amount of resistance of the rheostat which is connected in series with the excitation winding 79. A predetermined relation of the critical speed of the regulator generator 77 to the opening of the butterfly valve 115 and, therefore, to the control of the rotation of the prime mover 71 and of the metadyne generator 1 thereby is secured. When the control device has thus operated to move the valve 101 to fixed position, regulation of the circuits and of the currents flowing therein takes place in the manner which has been described above by virtue of the several variator windings 15, 17, 55, 19, 21, 61 associated with the primary brushes 3, 5 and the variator windings 25, 27, 57, 29, 31, 63 associated with the secondary brushes 4, 6.

The contact 65 of the potentiometer 69 also is carried upon the arm 125 and determines the portion of the resistance of this potentiometer which is to be utilized for variation of the current flowing in the variator windings 61 and 63. It will be apparent that when the arm 125 is set in a position in which upon engagement of the toe-piece 135 with the notch 151 the butterfly valve will be nearly closed a greater amount of resistance is provided in the potentiometer 69 over which the contact 67 of this potentiometer which is carried by the arm 117 may be required to move before the contacts 65, 67 are brought into register and all of the resistance between them is cut out, thereby reducing the excitation of the windings 61 and 63 to zero. If on the other hand the arm 125 is moved in a counter-clockwise direction in Fig. 4 to a position more nearly horizontal, engagement by the toe-piece 135 in the notch 151 will occur when the valve 115 is open to a greater degree. Less of the potentiometer resistance 69 will be traversed by the movable contact 67 before the toe-piece 135 engages the notch 151 concomitantly with the contact 67 coming into register with the contact 65 to reduce to zero the potential across the excitation windings 61 and 63.

When it is desired to reset the arm 125 to a new position for changing the given speed of the prime mover and, therefore, of the metadyne generator, the sleeve 131 may be lifted by means of the handle 132 to remove toe-piece 135 from the notch 151. The contacts 139 thereby may be closed to energize the solenoid 141 and thus to short circuit the variator windings 21 and 31 until the quadrant 119 again is moved by operation of the governing motor 95 to bring the notch 151 again into register with the toe-piece 135. On opening of the contacts 139 as the sleeve moves and as the toe-piece enters the notch 151 the solenoid 141 again will be deenergized and the blade 101 will be rotated in the counterclockwise direction into contact alone with the conductor bar 105, thereby again to connect in series the regulator generator 77, the opposed direct current generator 85, the field 93 of the governing motor and the variator windings 21 and 31 which thereafter may modulate the current in the external circuits 7 and 11 in the manner above described.

In Fig. 5 is shown a modification of the apparatus of Fig. 1 in which the requisite variator windings are associated with amplifier metadynes. The amplifier metadyne 161 is connected in series with stator windings 163, 165, 167, 169 wound upon respective pole pieces or polar segments which are placed intermediate between the brushes 3, 4, 5, 6. The amplifier metadyne 171 is connected in series with the variator windings 173, 175, 177, 179 wound upon the same respective pole pieces. The windings 163, 165, 167, 169 and the windings 173, 175, 177, 179 are so wound upon the polar pieces that the fluxes generated thereby have their axes in the directions, for example, of the arrows shown in Fig. 5, that is, so that the effective magnetic axes of the fluxes produced by the respective windings energized by the amplifier metadynes 161, 171 are substantially in line with the axes of the fluxes generated by the currents flowing through the armature between brushes 4, 6 and between brushes 3, 5. Thus the windings 163, 165, 167, 169 connected to the amplifier metadyne 161 may produce a flux the effective axis of which is in line with the secondary brushes 4, 6, and directed toward the right in Fig. 5. The variator windings 173, 175, 177, 179 which are connected to the amplifier metadyne 171 may produce a flux which is in line with the primary brushes 3, 5 and are directed downwardly in Fig. 5.

Associated with the amplifier metadyne 161 is a variator winding 181 connected in series with an adjustable resistance 182 across a source of constant potential, thereby providing constant ampere turns producing a flux having its magnetic axis in line with the flux produced in the amplifier metadyne by the current flowing between the secondary brushes thereof. Variator winding 181 acting through the amplifier metadyne 161 and the stator windings 163, 165, 167, 169 is effective with respect to the flux generated in the armature by the current flowing between the secondary brushes 4, 6 of the metadyne generator in the same manner as the variator winding 25 of Fig. 1. The variator winding 183, similarly positioned as to its magnetic axis as is the variator winding 181, is connected across the secondary brushes 4, 6 and acts, therefore, in the same manner as does the variator winding 27 in Fig. 1. The variator winding 185, having its magnetic axis in line with that of the windings 181 and 183, is connected across the primary brushes 3, 5 and acts, therefore, in a manner similar to the variator winding 57 of Fig. 1. The variator winding 187 is connected in series with the auxiliary generator 41 and acts, therefore, in a manner similar to the variator winding 29 of Fig. 1. The auxiliary generator 41 is provided with an excitation winding 45 connected across a source of constant potential and also with the winding 51 connected across secondary brushes 4, 6 in the same manner and for the same purpose as described in connection with Fig. 1. The variator winding 189 is connected in series with the regulator generator 77 having a shunt field 79, this winding 189 being also connected in series with the similar variator winding 209 associated with the amplifier metadyne 171. Thus these windings 189 and 209 and the generator 77, being connected across a source of constant potential as in Fig. 1 function to produce in the metadyne generator 1 the same effect as do the windings 21 and 31 of Fig. 1.

Also associated with the amplifier metadyne 161 and having its magnetic axis in line with the axes of the other variator windings of this amplifier metadyne is a variator winding 191 which functions in a manner similar to the variator winding 24 of Fig. 1. The variator winding 191 is connected across a shunt 193 inserted in the lead 11 of the secondary exterior load circuit connected to load 13. This shunt 193 provides a measure of the current flowing in this circuit and, therefore, is effective to impress a potential difference upon the variator winding 191 in proportion to this current. Since the current necessary for proper energization of the several variator windings associated with the amplifier metadyne 161 is only a fraction of that required for direct excitation of corresponding variator windings directly associated with the secondary brushes of the metadyne 1 as in Fig. 1, the shunt 193 is effective to supply sufficient current for energization of the variator winding 191 to produce the desired modulation in the secondary circuit connected to the metadyne 1. The amplifier metadyne 161, moreover, in accordance with the well known operation of such metadynes is effective to produce the requisite energization of the variator windings 163, 165, 167, 169 of the generator metadyne 1 to which the amplifier metadyne 161 is connected.

The amplifier metadyne 171 is similarly provided with variator windings 201, 203, 205, 207, 209 which function in a corresponding manner to the variator windings 181, 183, 185, 187, 189 to modulate the current flowing from the amplifier metadyne 171 through the variator windings 173, 175, 177, 179 of the metadyne generator 1 of Fig. 5. The variator windings 201, 203, 205, 207, 209 function to produce the same modulating effect in the apparatus of Fig. 5 as do the variator windings 15, 17, 55, 19, 21 in the apparatus of Fig. 1.

Also associated with the amplifier metadyne 171 is a variator winding 211 connected across a shunt 213 which is inserted in the lead 7 of the primary exterior circuit connected to the load 9. The shunt 213 functions in a manner similar to the shunt 193 to impress a potential upon the winding 211 proportionate to the current flowing in the circuit 7. The variator windings 201, 203, 205, 207, 209, 211, therefore, are effective to modulate the currents supplied by the amplifier metadyne to the variator windings 173, 175, 177, 179 of the metadyne generator 1 to modulate the effective flux which is in line with the flux produced by the armature current flowing between the primary brushes 3, 5. In the same manner and for the same purpose as described in connection with Fig. 1, the variator winding 207 of the amplifier metadyne 171 is supplied from an auxiliary generator 43 connected in series therewith, the auxiliary generator 43 having an excitation winding 47 connected across a source of constant potential and also a winding 53 connected across the primary brushes 3, 5 in the same manner as shown in Fig. 1.

In Fig. 6 is shown more or less diagrammatically a modification of the metadyne generator shown in Fig. 5 in which the windings carried by each polar segment are combined in a single winding. Thus the windings 163 and 173, Fig. 5, may be combined in a single variator winding 223, Fig. 6. The windings 165, 175 may be combined in a single winding 225. The windings 167 and 177 may be combined in a single winding 227. The windings 169 and 179 may be combined in a single winding 229. In order to produce the requisite fluxes with their magnetic axes extending respectively in line with the fluxes generated in the armature of the currents flowing between the primary brushes 3, 5 and between the secondary brushes 4, 6 in the embodiment of Fig. 6, the variator windings 223 and 227 which are upon oppositely disposed polar segments are supplied from the amplifier metadyne 231, the winding 223 being connected in series with the winding 227. These windings may be so wound upon the polar segments that the fluxes extend, for example, in the direction of the arrows upon these polar segments as shown in Fig. 6. The amplifier metadyne 233 is connected in series with the other two windings 225 and 229 which are connected in series with each other and are disposed on the other polar segments. These windings may be so wound on the polar segments that the fluxes produced thereby extend, for example, in the direction as shown by the arrows in Fig. 6. The variator windings for the amplifier metadynes 231 and 233 necessary for producing the energization of these windings on the polar segments are not shown in Fig. 6 but any one or all of these variator windings may be provided for each, or both, of these metadynes in the same manner and for the same purpose as described in connection with Fig. 5.

In Fig. 7 is shown diagrammatically a generator metadyne 1 having its armature mounted upon a shaft 75 for operation thereof. In this figure the disposition of the brushes and of the variator windings is shown for the general case. It will be noted that the primary brushes 3, 5 to which is connected the load 9 through the leads 7 are in positions other than 180° from each other about the armature of the metadyne generator 1. Similarly, the secondary brushes 4, 6 which are interplaced between the primary brushes 3, 5 are in positions other than 180° from each other and are disposed at less than 90° from respective primary brushes 3, 5. The secondary brushes 4, 6 are connected by leads 11 to the load 13. The dispositions of these brushes will be determined by the position of the effective axes of the fluxes which are generated in the armature by virtue of the currents flowing in the armature winding and in view of the armature structure in relation to the stator windings which may be differently designed for different purposes.

In Fig. 7 also are shown variator windings 235 and 237 representing any one or all of the variator windings as described in connection with Figs. 1, 4, 5 and 6. The disposition of these variator windings in general is such as to position the effective magnetic axes thereof substantially in line with the axes of the fluxes generated by the current flowing between the respective brushes in the armature. The position, number of turns, amperes, and direction of flux of these variator windings and the positions of the polar segments on which they may be carried may be determined by the characteristics of the load circuits which it is desired to secure which are connected respectively to the primary and to the secondary brushes. In all cases, however, the control of the current flowing in these circuits may be accomplished in the manner above described by providing the proper characteristics of the magnetic circuits to secure the reduction or elimination of the effects of the magnetizing current and thereby to make approximately or precisely effective the modulations secured by means of the variator windings. The means which are provided according to the invention for controlling the speed of the metadyne generator armature and for regulating current flowing in the load circuits with variations in the speed also are made effective to secure precise control and regulation.

In Fig. 4 means also are shown which may be used for regulating the supply of the fluid to the prime mover between the cutoff or closed position of valve 115 and any predetermined limit corresponding to a predetermined opening of the valve 115. Such means may be used where it is desired to limit the maximum output of the metadyne generator. For this purpose an extension arm 240 carried by the quadrant 119 has its end 241 formed for engagement with a limit switch 243 having a pivoted contact member 245 biased by spring 247 into contact with a fixed contact 249. The pivoted member 245 carries an insulating block 251 which the end 241 of the arm 240 engages upon pivoted movement of the arm 240 and the quadrant 119 about the axis of the spindle 113 as the valve 115 is moved to different positions by the governing motor 95. The contacts are supported by insulating supports on a base 250.

The base 250 of the switch 243 is carried by an arcuate slotted member 253 through the slot 255 of which passes a fastening 256 which serves to fasten the member 253 and the switch 243 in any desired position within the limits of the length of the slot 255. The arcuate member 253 and the slot 255 may be so formed and positioned that the switch 243 is moved in the arc of a circle about the axis of the spindle 113. When the arcuate member 253 is fastened in a selected position, such as that shown in Fig. 4, the end 241 of the arm 240 may move into contact with the block 251 as the valve 115 opens and will press the contact 245 downwardly in Fig. 4 to separate the contact 245 from the fixed contact 249. The movement of the pivoted contact 245 is limited by stop 258. Thus, the circuit is opened through switch 243 and solenoid 141 and contacts 139 when a short circuiting switch 260 in the lead 261 between the solenoid 141 and contacts 139 is open. When this short circuiting switch 260 is closed the system may operate, as above described, to effect control by means of the quadrant 119 and lever 125, the arcuate member 253 being moved by the operator downwardly to a position where the end 241 of arm 240 will not engage the switch 243. Placement of the switch 243 in different position will be effective to provide operation corresponding to different degrees of maximum opening of the valve 115.

Opening of the switch 243, the short circuiting switch 260 being open, deenergizes the solenoid 141 and moves the switch blade 101 into contact with the bar 105 to provide regulation of the metadyne generator by the regulator generator 77 as above described. Under these conditions it is necessary to eliminate the effect of variator windings 61 and 63 and a switch 263 is provided in the lead 265 from these windings to the potentiometer which may be opened when it is desired to operate under control of the switch 243 and the arm 240. In such operation, in order to prevent locking of the quadrant 119 by the toe-piece entering the notch 151 a filler piece may be inserted in this switch or the switch may be otherwise covered so that the quadrant 119 may move freely past the arm 125 to the positions thereof as determined by the governing motor 95. If desired the switches 260 and 263 may be operatively connected together by mechanical means so that both are opened and closed together.

Although the invention has been described in connection with the drawings which show a single cycle metadyne generator having a pair of primary brushes and a pair of secondary brushes, it will be understood that the features which have been described are applicable to multi-cycle metadyne generators embodying the same means for controlling the currents flowing in a plurality of independent exterior load circuits connected to the respective sets of brushes. Some of the variator windings shown and described in connection with the drawings may be omitted for some purposes. In certain cases also a variator winding for a given modulation may be omitted in connection with one set of brushes and utilized in connection with the other set of brushes. While the means for driving the metadyne generator shown in the drawings is a prime mover utilizing a fluid for operation thereof requiring valve means for controlling the flow of the fluid, within the scope of the invention other mechanical and electrical arrangements including electrical driving means may be used to accomplish the controlled driving of the metadyne generator which makes possible the requisite regulation and modulation as above described. Other variations of the embodiments disclosed and described may be made within the scope of the invention and all such variations are intended to be covered by the appended claims.

I claim:

1. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, and means for connecting said variator windings respectively across selected sources of direct current potential differences having predetermined characteristics to determine the currents flowing in said circuits, at least one of said variator windings being connected across a selected set of brushes and so that the flux generated therein is in the same direction as the flux generated by the current flowing in the armature between the brushes with which said variator winding is associated.

2. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, said variator windings being wound upon iron cores of a stator providing with the armature a magnetic circuit, said magnetic circuit and the electrical circuits through the armature being so constructed that the magnetizing current flowing in the armature between the brushes with which said variator windings respectively are associated is not substantially greater than 10% of the total current flowing through the armature between said brushes, and means for connecting said variator windings respectively across selected sources of direct current potential differences having predetermined characteristics to determine the currents flowing in said circuits, at least one of said variator windings being connected across a selected set of brushes and so that the flux generated therein is in the same direction as the flux generated by the current flowing in the armature between the brushes with which said variator winding is associated.

3. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting one of said variator windings across a potential difference varying with variations in the potential difference between the brushes of a selected one of said sets of brushes, and means for connecting the other of said variator windings across a potential difference varying with variations in the potential difference between the brushes of the other set of said brushes, at least one of said variator windings being connected across a selected set of brushes and so that the flux thereof is generated in the same direction as the flux generated by the current flowing in the armature between the brushes with which said variator winding is associated.

4. In a dynamoelectric machine having an armature, a commutator for said armature, and means for effecting rotation of said armature, the combination as defined in claim 1 which comprises an additional variator winding having its effective magnetic axis extending substantially in line with the axis of the flux developed by the current flowing through the armature between said primary brushes, variator winding having its effective magnetic axis extending substantially in line with the axis of the flux developed by the current flowing through the armature between the secondary brushes, and means for connecting said additional variator windings respectively associated with said primary and said secondary brushes respectively across potential differences varying with the variations in the potential differences between the primary brushes and between the secondary brushes.

5. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, a variator winding having its effective magnetic axis extending substantially in line with the axis of the flux developed by the current flowing through the armature between said primary brushes, a variator winding having its effective magnetic axis extending substantially in line with the axis of the flux developed by the current flowing through the armature between the secondary brushes, means for connecting said variator windings respectively associated with said primary and said secondary brushes respectively across potential differences varying with variations in the potential differences between said secondary brushes and said primary brushes, and means for limiting the fluxes produced by the respective variator windings to less than saturation to provide for the building up condition in the respective magnetic circuits.

6. In a dynamoelectric machine the combination as defined in claim 1 which comprises constant flux producing windings associated with the respective sets of brushes and having their effective axes extending substantially in line with the axes of the fluxes developed by the currents flowing through the armature respectively between the primary brushes and between the secondary brushes, and means connected to said constant flux producing windings to provide constant potential differences respectively across the terminals of said windings.

7. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, and means for connecting said variator windings respectively across selected sources of direct current potential difference having predetermined characteristics to determine the currents flowing in said circuits, said variator windings comprising auxiliary windings associated with the respective sets of brushes and having their effective magnetic axes respectively extending substantially in line with the axes of the fluxes developed by the currents flowing through the armature respectively between the primary brushes and between the secondary brushes, said auxiliary windings respectively being connected to auxiliary direct current generators driven at substantially constant speed above the point of saturation of the field, said generators having field windings respectively connected across the brushes of the pairs of brushes with which the respective auxiliary windings are associated.

8. In a dynamoelectric machine the combination as defined in claim 4, which comprises a supplementary variator winding associated with each set of brushes and having its effective magnetic axis extending substantially in line with the axis of the flux developed by the current flowing through the armature respectively between the primary brushes and between the secondary brushes, and means including resistances in series with the respective supplementary windings for connecting said supplementary variator windings respectively across the potential differences between the brushes with which the other of said supplementary variator windings is associated, said resistances being so adjusted as to limit the fluxes produced by the respective variator windings to less than saturation to provide for the building up condition in the respective magnetic circuits.

9. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between said primary brushes and between said secondary brushes, and a regulator direct current generator operatively connected to said means for effecting rotation of said armature to rotate in a predetermined relation thereto, said regulator variator windings being connected in series with each other and with said regulator generator.

10. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between said primary brushes and between said secondary brushes, and a regulator direct current generator operatively connected to said means for effecting rotation of said armature to rotate in a predetermined relation thereto, said regulator variator windings being connected in series with each other and with said regulator generator, said regulator generator and said regulator variator windings connected in series therewith being connected in series with a source of substantially constant potential.

11. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between said primary brushes and between said secondary brushes, a regulator direct current generator operatively connected to said means for effecting rotation of said armature to rotate in a predetermined relation thereto, said regulator variator windings being connected in series with each other and being connected in series with said regulator generator, and means operable to disconnect said regulator variator windings and operatively connected to said means for effecting rotation of said armature to effect such disconnection of and connection of said regulator variator windings substantially at a predetermined speed of said armature.

12. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes, a regulator direct current generator operatively connected to said means for effecting rotation of said armature to rotate in a predetermined relation thereto, said regulator variator windings being connected in series with each other and being connectible in series with said regulator generator, a direct current generator electrically connected in opposed relation to said regulator generator and operatively connected to said means for effecting rotation of said armature to rotate in a predetermined relation thereto, an oscillatable relay having an excitation winding connected in series with said regulator generator and with said opposed direct current generator. and means for varying the speed of said armature, said oscillatable relay being operatively connected to said means for varying the speed of said armature so as to operate said means to and fro to maintain said speed within a predetermined range of variation.

13. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes, a regulator direct current generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, said regulator variator windings being connected in series with each other and being connectible in series with said regulator generator and with said opposed direct current generator, and means for controlling said means for effecting rotation of said armature to control the speed of said armature, said governing motor being operatively connected to said control means to effect operation thereof to control the speed of said armature within a predetermined range.

14. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct curent potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes, a regulator direct current generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, said regulator variator windings being connected in series with each other and being connectible in series with said regulator generator and with said opposed direct current generator, means for controlling said means for effecting rotation of said armature to control the speed of said armature, said governing motor being operatively connected to said control means to effect operation thereof to control the speed of said armature within a predetermined range, and means for engaging said control means upon movement thereof to a predetermined control position and thereupon effective to prevent further movement of said control means.

15. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes, a regulator direct current generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, said regulator variator windings being connected in series with each other and being connectible in series with said regulator generator and with said opposed direct current generator, means for controlling said means for effecting rotation of said armature to control the speed of said armature, said governing motor being operatively connected to said control means to effect operation thereof to control the speed of said armature within a predetermined range, and means for engaging said control means upon movement thereof to a pretermined control position and thereupon effective to prevent further movement of said control means, and means cooperating with said engaging means upon engagement thereby of said control means for connecting said regulator variator windings in series with said regulator generator.

16. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the current flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes, a regulator generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, said regulator variator windings being connected in series with each other and being connectible in series with said regulator generator and with said opposed direct current generator, said means for effecting rotation of said armature comprising a fluid operated prime mover operatively connected to said armature to effect rotation thereof, conduit means for conducting a fluid to said prime mover for operation thereof, and control means cooperating with said conduit means for controlling the flow of fluid to said prime mover to control the speed of said prime mover and said armature, said governing motor being operatively connected to said control means to effect operation thereof to control the flow of fluid to said prime mover to maintain the speed thereof within a predetermined range.

17. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes, a shunt field regulator generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, said regulator variator windings being connected in series with each other and being connectible in series with said regulator generator and with said opposed direct current generator, said means for effecting rotation of said armature comprising a fluid operated prime mover operatively connected to said armature to effect rotation thereof, conduit means for conducting a fluid to said prime mover for operation thereof, control means cooperating with said conduit means for controlling the flow of fluid to said prime mover to control the speed of said prime mover and said armature, said governing motor being operatively connected to said control means to effect operation thereof to control the flow of fluid to said prime mover to maintain the speed thereof within a predetermined range, means for engaging said control means upon movement thereof to a predetermined position for controlling the fluid conducted to said prime mover and thereupon effective to prevent further movement of said control means, said engaging means being supported for movement to different positions of engagement with said control means, and a rheostat connected in series with the shunt field of said regulator generator, the movable member of said rheostat being operatively connected to said engaging means for movement therewith as said engaging means is moved to different positions of engagement with said control means, thereby to adjust the excitation of said regulator generator and thus to adjust the flux of said regulator variator windings when connected in series with said regulator generator to correspond to different predetermined speeds of said armature and said regulator generator rotating concomitantly therewith.

18. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between the primary brushes and between the secondary brushes of said dynamoelectric machine, a regulator direct current generator electrically connectible to said regulator variator windings and operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, and means for varying the speed of said armature, said governing motor being operatively connected to said means for varying the speed of said armature to increase and decrease said speed in accordance with the direction of rotation of said governing motor, said regulator direct current generator having a characteristic such that the critical speed at which the voltage of said generator rapidly increases is higher than the critical speed of said opposed direct current generator and that the voltage generated by said regulator generator above said critical speed thereof is higher than the voltage generated by said opposed direct current generator above its critical speed.

19. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with axes of the fluxes which are developed by the currents flowing through the armature between the primary brushes and between the secondary brushes of said dynamoelectric machine, a regulator direct current generator electrically connectible to said regulator variator windings and having a shunt field and being operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, means for varying the speed of said armature, said governing motor being operatively connected to said means for varying the speed of said armature to increase and decrease said speed in accordance with the direction of rotation of said governing motor, said regulator direct current generator having a characteristic such that the critical speed at which the voltage of said generator rapidly increases is higher than the critical speed of said opposed direct current generator and that the voltage generated by said regulator generator above said critical speed thereof is higher than the voltage generated by said opposed direct current generator above its critical speed, and a rheostat connected to said shunt field of said regulator generator and operable to adjust the excitation of said regulator generator to determine the voltage of said opposed direct current generator.

20. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, a regulator shunt field direct current generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, means for controlling the speed of said armature, said governing motor being operatively connected to said means for controlling the speed of said armature to increase and decrease said speed in accordance with the direction of rotation of said governing motor, said regulator direct current generator having a characteristic such that the critical speed at which the voltage of said generator rapidly increases is higher than the critical speed of said opposed direct current generator and that the voltage generated by said regulator generator above said critical speed thereof is higher than the voltage generated by said opposed direct current generator above its critical speed, and a rheostat connected in series with the shunt field of said regulator generator and operable to adjust the excitation of said regulator generator to determine the voltage thereof in relation to the voltage of said opposed direct current generator, said rheostat being operatively connected to said means for controlling the speed of said armature concomitantly to adjust the excitation of said regulator generator to determine the operation of said governing motor to determine the speed of said armature.

21. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising adjustor variator windings respectively associated with said primary and said secondary brushes of said dynamoelectric machine and having their effective magnetic axes respectively extending substantially in line with the axes of the fluxes which are developed by the currents flowing through the armature between said primary brushes and between said secondary brushes, said adjustor variator windings being connected in series with each other and with a movable element of an adjustable potentiometer, and control means operatively connected to said means for effecting rotation of said armature and operable to control the speed of said armature, said control means being operatively connected to said movable element of said potentiometer to vary the potential across said series connected adjustor variator windings concomitantly with variations in the speed of said armature.

22. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, a plurality of amplifier metadynes having the secondary brushes thereof respectively connected in series with said variator windings associated with said primary and said secondary brushes of said dynamoelectric machine, said amplifier metadynes respectively having variator windings associated with said secondary brushes thereof and positioned with their effective magnetic axes extending substantially in line with the flux generated by the current flowing through the armature between said secondary brushes thereof, and means for connecting said variator windings of the respective amplifier metadynes across said selected potential difference.

23. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, a plurality of amplifier metadynes having the secondary brushes thereof respectively connected in series with said variator windings associated with said primary and said secondary brushes of said dynamoelectric machine, said amplifier metadynes respectively having auxiliary variator windings associated with said secondary brushes thereof and positioned with their effective magnetic axes extending substantially in line with the flux generated by the current flowing through the armature between said secondary brushes thereof, and means for connecting said auxiliary variator windings of the respective amplifier metadynes in series respectively with auxiliary direct current generators, said auxiliary direct current generators having field windings connected respectively across the brushes of said dynamoelectric machine with which said variator windings of said dynamoelectric machine are associated which are in series with the respective amplifier metadynes.

24. In a dynamoelectric machine the combination as defined in claim 1 in which said variator windings respectively associated with said primary and said secondary brushes each comprise a plurality of coils respectively wound upon a plurality of polar segments respectively positioned between adjacent primary and secondary brushes about said armature, the coils of each of said variator windings on adjacent polar segments being connected in series with each other across a selected source of direct current potential difference.

25. In a dynamoelectric machine the combination as defined in claim 1 in which said variator windings respectively associated with said primary and said secondary brushes each comprise a plurality of coils respectively wound upon a plurality of polar segments respectively positioned between adjacent primary and secondary brushes about said armature, the coils of each of said variator windings on alternate polar segments being connected in series with each other and across a selected source of direct current potential difference.

26. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings respectively associated with said primary and said secondary brushes each comprising a plurality of coils respectively wound upon a plurality of polar segments respectively positioned between adjacent primary and secondary brushes about said armature, and a plurality of amplifier metadynes, respective coils on said polar segments being connected in series with each other and in series with the secondary brushes respectively of said plurality of amplifier metadynes.

27. In a dynamoelectric machine an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings respectively associated with said primary and said secondary brushes each comprising a plurality of coils respectively wound upon a plurality of polar segments respectively positioned between adjacent primary and secondary brushes about said armature, and a plurality of amplifier metadynes, the coils of each winding being wound on alternate polar segments and being connected in series with each other and in series with the secondary brushes respectively of said plurality of amplifier metadynes.

28. In a dynamoelectric machine the combination as defined in claim 1 which comprises a plurality of amplifier variator windings associated with the respective sets of brushes of said dynamoelectric machine and having their effective axes extending substantially in line with the axes of the fluxes developed by the currents flowing through the armature respectively between the primary brushes and between the secondary brushes, said amplifier variator windings being connected in series in the respective primary and secondary exterior circuits.

29. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, and a plurality of amplifier variator windings associated with the respective sets of brushes of said dynamoelectric machine and having their effective axes extending substantially in line with the axes of the fluxes developed by the currents flowing through the armature respectively between the primary brushes and between the secondary brushes, said amplifier variator windings being connected in series in the respective primary and secondary load circuits and generating fluxes which respectively are in the same direction as said fluxes developed by the currents flowing through the armature respectively between the primary brushes and between the secondary brushes.

30. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, a plurality of amplifier metadynes respectively associated with the primary and secondary brushes of said dynamoelectric machine having the secondary brushes thereof respectively connected in series with said variator windings which are associated with said primary and said secondary brushes of said dynamoelectric machine, said amplifier metadynes respectively having indirect amplifier variator windings associated with the secondary brushes thereof and positioned with their effective magnetic axes extending substantially in line with the flux generated by the current flowing through the armature between said secondary brushes of the respective amplifier metadynes, and a shunt connected in series in each of said exterior circuits, said indirect amplifier windings of the amplifier metadynes which respectively are associated with said primary and said secondary brushes being connected across said shunts which respectively are in said primary and said secondary exterior circuits.

31. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armatures between said primary brushes and between said secondary brushes, a regulator direct current generator operatively connected to said means for effecting rotation of said armature to rotate in a predetermined relation thereto, said regulator variator windings being connected in series with each other and being connectible in series with said regulator generator, and means operable to connect and disconnect said regulator variator windings and operatively connected to said means for effecting rotation of said armature to effect such connection and disconnection of said regulator variator windings in accordance with variations in the output of said metadyne generator.

32. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, said variator windings comprising regulator variator windings respectively associated with said primary and said secondary brushes and having their effective magnetic axes extending respectively substantially in line with the axes of the fluxes which are developed by the currents flowing through the armature between said primary brushes and between said secondary brushes, a regulator direct current generator operatively connected to said means for effecting rotation of said armature to rotate in a predetermined relation thereto, said regulator variator windings being connectible in series with each other and being connected in series with said regulator generator, said means for effecting rotation of said armature including a fluid operated prime mover operatively connected to said metadyne generator to drive said metadyne generator, a fluid control device operable to control the fluid delivered to said prime mover, and means operable to connect and disconnect said regulator variator windings and operatively connected to said fluid control device to effect such connection and disconnection of said regulator variator windings concomitantly with operation of said control device to control said prime mover driving said metadyne generator.

33. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting said variator windings respectively across selected sources of direct current potential difference having predetermined characteristics to determine the currents flowing in said circuits, a regulator direct current generator operatively connected to said means for effecting rotation of said armature to rotate in a predetermined relation thereto, a direct current generator electrically connected in opposed relation to said regulator generator and operatively connected to said means for effecting rotation of said armature to rotate in a predetermined relation thereto, a governing motor having a field winding, said field winding of said motor being connected in series with said regulator generator and with said opposed direct current generator, means for controlling said means for effecting rotation of said armature, said governing motor being operatively connected to said controlling means to increase and decrease the speed of rotation of said armature in accordance with the direction of rotation of said governing motor, said regulator direct current generator and said opposed direct current generator having characteristics to produce flow of current through the field winding of said governing motor in one direction or the other depending upon the speed of said armature of said dynamoelectric machine correspondingly to rotate said governing motor in one direction or the other, and means operatively connected to said controlling means and effective to produce a predetermined maximum output of said dynamoelectric machine upon operation of said controlling means to control said means for effecting rotation of said armature.

34. In a dynamoelectric machine having an armature, a commutator for said armature, and means for effecting rotation of said armature, the combination therewith of a set of primary brushes associated with said commutator and connectible to an exterior circuit, a set of secondary brushes associated with said commutator and connectible to a separate exterior circuit, said secondary brushes respectively being interplaced between said primary brushes about said commutator, variator windings respectively associated with said primary and said secondary brushes and having their effective magnetic axes respectively extending substantially in line with the axes of the fluxes which are developed by the currents flowing through the armature between said primary brushes and between said secondary brushes, means for connecting a variator winding associated with the primary brushes across a potential difference varying with variations in the potential difference between the secondary brushes and so that the flux of said variator winding is generated in the same direction as the flux generated by the current flowing in the armature betwen the primary brushes, and means for connecting a variator winding associated with the secondary brushes across a potential difference varying with variations in the potential difference between the primary brushes and so that the flux of said variator winding associated with said secondary brushes is generated in the same direction as the flux generated by the current flowing in the armature between the secondary brushes.

JOSEPH MAXIMUS PESTARINI.

REFERENCES CITED

The following references are of record in the file of this patent:

UNITED STATES PATENTS

| Number | Name | Date |
| --- | --- | --- |
| 914,177 | Osnos | Mar. 2, 1909 |
| 2,138,666 | Pestarini | Nov. 29, 1938 |
| 2,203,544 | Pestarini | June 4, 1940 |

FOREIGN PATENTS

| Number | Country | Date |
| --- | --- | --- |
| 448,253 | Great Britain | June 2, 1936 |

Certificate of Correction

Patent No. 2,498,765                                                February 28, 1950

JOSEPH MAXIMUS PESTARINI

It is hereby certified that errors appear in the printed specification of the above numbered patent requiring correction as follows:

Column 10, line 9, for the indistinct numeral before "are" read *57*; column 12, line 4, for "potention" read *potential*; column 34, line 51, after the word "machine" insert *having*;

and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*